United States Patent [19]

Takenoya et al.

[11] Patent Number: 4,640,210

[45] Date of Patent: Feb. 3, 1987

[54] COMPUTER CONTROLLED SEWING MACHINE

[75] Inventors: Hideaki Takenoya; Mikio Inamori, both of Tokyo; Eiichi Shomura, Hachioji, all of Japan

[73] Assignee: Janome Sewing Machine Co, Ltd., Tokyo, Japan

[21] Appl. No.: 609,562

[22] Filed: May 11, 1984

[30] Foreign Application Priority Data

May 11, 1983 [JP]  Japan .................................. 58-80966

[51] Int. Cl.$^4$ ............................................ D05B 3/02
[52] U.S. Cl. ...................................... 112/456; 112/315
[58] Field of Search ............ 112/158 E, 158 B, 121.11, 112/121.12, 453, 456, 314, 315, 316, 317

[56] References Cited

U.S. PATENT DOCUMENTS

| | | | |
|---|---|---|---|
| 4,343,249 | 8/1982 | Takenoya et al. | 112/158 E |
| 4,413,577 | 11/1983 | Minalga et al. | 112/158 E |
| 4,469,035 | 9/1984 | Bergvall | 112/158 B |

*Primary Examiner*—Peter Nerbun
*Attorney, Agent, or Firm*—Michael J. Striker

[57] ABSTRACT

This invention relates to a computer controlled sewing machine, and more particularly to such a sewing machine which is incorporated therein with a plurality of feed adjusting switches for giving information to a micro-computer housed in the sewing machine, in order to correct irregularities of forward and backward feed amounts.

2 Claims, 6 Drawing Figures

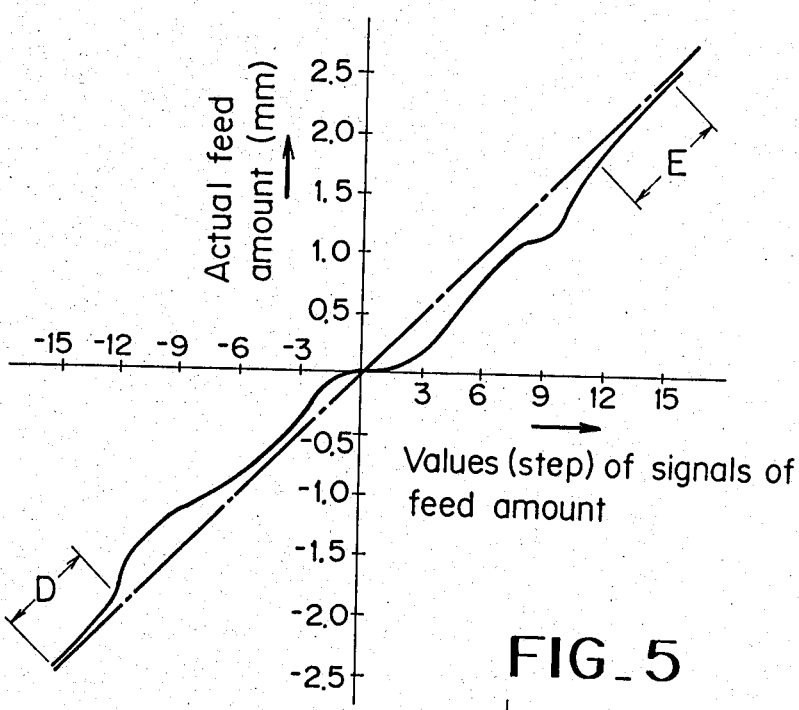
FIG_1
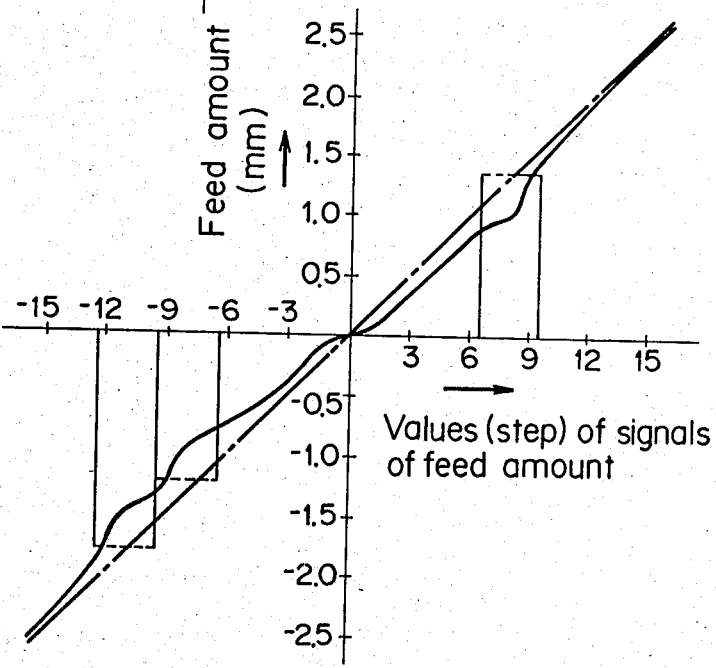
FIG_5

FIG_2
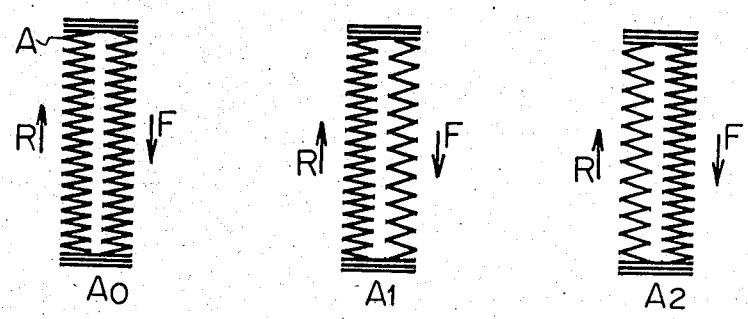
FIG_3
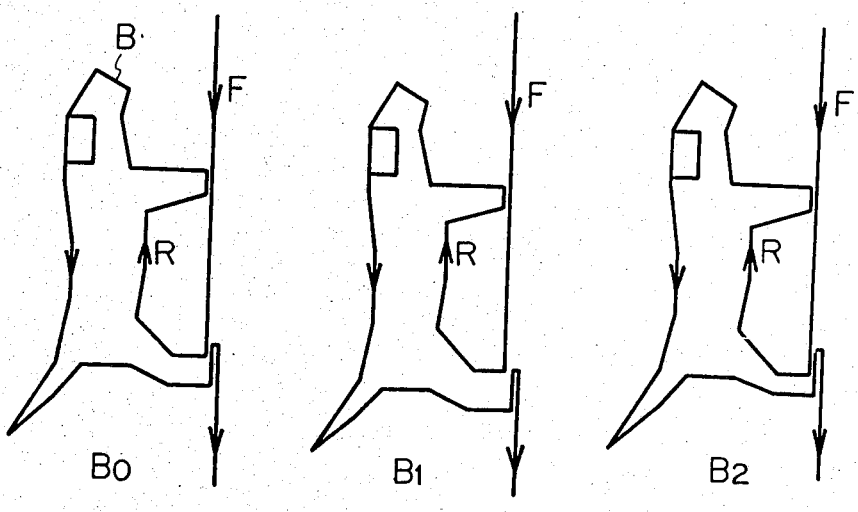
FIG_4
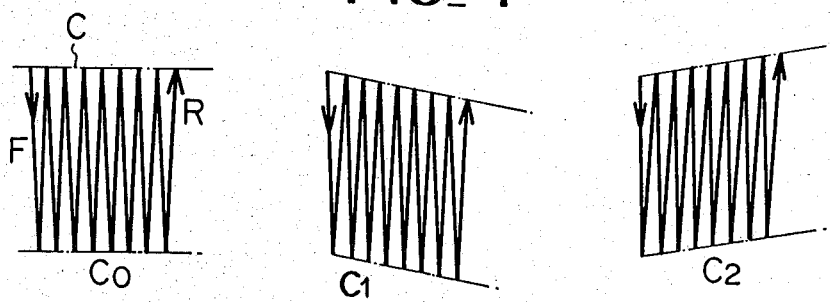

FIG_6
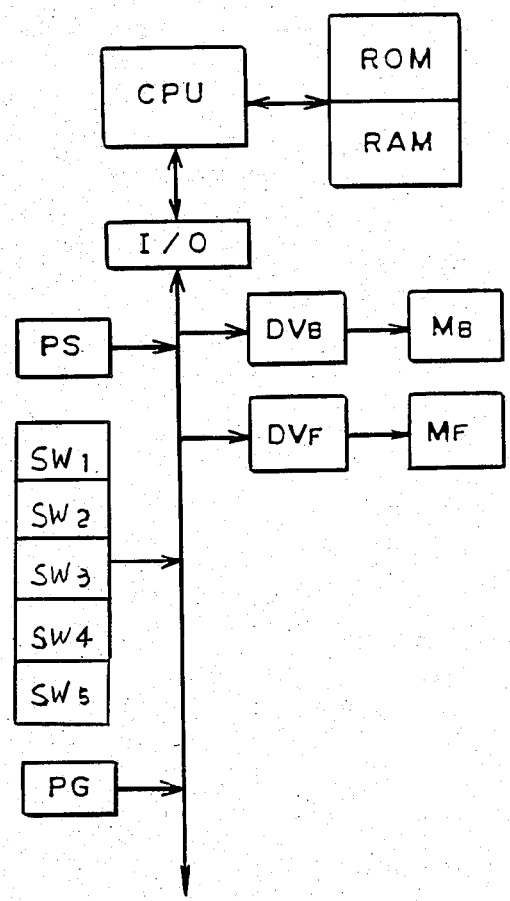

COMPUTER CONTROLLED SEWING MACHINE

BACKGROUND OF THE INVENTION

In conventional mechanical sewing machines, the amounts of feeding a fabric to be sewn by a feed dog just following values on design (expected value) could scarcely be obtained due to rattlings of feeding mechanisms, irregularities in sizes at composing members and others. Further, said values are not constant for various sewing machines. In this regard, since in said mechanical sewing machines, stitching numbers for forming stitched patterns have been at most 20 stitches, differences between forward and backward feeds, and their accumulated errors have not been practical problems so much.

However, said differences and accumulated errors are serious problems to the sewing machines which electronically store, as pattern signals, amplitude amount of the patterns and feed amount, output the pattern signals to an amplitude control motor and a feed control motor, thereby to control the amplitude control mechanism and the feed mechanism, and produce stitched patterns. Because the sewing machine has unlimited the stitching numbers, it can produce complicated patterns such as alphabet, Japanese letters, abstract patterns or the like, which require much stitching.

Following explanation will be made with reference to FIGS. 1 to 4 for convenience. A stepping motor is used in the sewing machine, and FIG. 1 shows one example between the signal values of the feed amount and the actual feed amount. In the same, the signal values of the feed amount are shown with stepping number of the motor. If the actual feed amount were obtained as the signal value, the feed amount would be drawn as shown with one dotted line. But the actual feed amount is more or less deviated from the signal value of the feed amount by rattlings of the complicated feed mechanism and their accumulation, through manufacturing tolerance of each of the composing members is set within tolerance of the drawings. Although the deviation from the signal value fall within certain ranges in the forward and backward feed amounts, those are made not at fixed rate but irregularly, and irregularities are different in respective sewing machines.

The feed amounts are comparatively stable in the vicinity of intervals shown with, for example, D and E in FIG. 1 with respect to the individual sewing machines, and values near the expected values are obtained. Therefore, some methods use only values around said intervals in order to remove the above problems. However, since the feed amount is included in the large forward and backward ranges, patterns to be formed with those data are limited in themselves.

Another method divides the stitching patterns into a plurality of stitching blocks for making moderate the accumulated errors of the forward and backward feeds of the stitched patterns, as disclosed in the Japanese Patent Application No. 57-174640 by the same applicants.

Complicated patterns of many stitchings have been increased and there have appeared such patterns which could not be limited by the above mentioned two methods. Since the forward and backward feed amounts are not equal as mentioned above, and are different with respect to the individual sewing machines, it is necessary as a matter of fact to provide proper pattern data per each of the sewing machines, but such a matter is quite impossible.

FIGS. 2 to 4 show representative patterns (called as "specific pattern" hereafter) which are easily deformed by the difference between the forward and backward feed amounts and their accumulation.

In them, F arrows are directions of forming stitches by the forward feed, and R arrows are those by the backward feed.

"A" is a buttonhole which is formed with small feed amounts of the feed amounts from the small feed amount of the forward and backward feeds to the large feed amount, and "C" is a darning pattern which is formed with comparatively large feed amounts of the forward and backward feeds. The patterns $A_0$, $B_0$, $C_0$ are produced in standard form. The patterns $A_1$, $B_1$, $C_1$ and $A_2$, $B_2$, $C_2$ are produced as a result of deformation due to the forward feed amount being larger than the backward feed amount, or the forward feed amount being smaller than the backward feed amount.

Since the actual feed amounts are irregular as said above, for example, A, B, C are stitched as $A_2$, $B_1$, $C_0$, and it was not possible to stitch said three patterns regularly by means of the mechanical adjustment.

SUMMARY OF THE INVENTION

The present invention has been provided to eliminate the defects and disadvantages of the prior art.

It is therefore a primary object of the invention to provide a computer sewing machine which may be easily adjusted to produce in a standard form as expected any stitch patterns including the specific patterns composed of a comparatively large number of stitches accompanied by the fabric feeding amounts variable to the forward and rearward fabric feeding directions.

It is another object of the invention to provide a predetermined number of adjusting switches in the computer sewing machine, which may be individually set ON or OFF at the stage of factory assembly of the sewing machines especially in reference to the formation of the above mentioned specific patterns, so as to give the micro-computer of the sewing machine a signal indicating the correction of the irregularities in the fabric feeding amounts in the forward and rearward feeding directions. The other features and the advantages of the invention will be apparent from the following description of a preferred embodiment in reference to the attached drawings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a linear diagram showing an example of relation between signal values of the feed amount and the actual feed amount;

FIGS. 2 to 4 are linear diagrams showing stitching conditions of the specific patterns stereotyped;

FIG. 5 is a linear diagram showing one example when the feed amount is corrected by a stereotyped data converting table; and FIG. 6 is a block diagram of control circuit according to the invention.

DETAILED DESCRIPTION OF THE INVENTION

In reference to FIGS. 1 through 4, among the patterns stored in a computer sewing machine, the three types of patterns A, B, C are typically subjected to deformation due to the deviation of actual fabric feeding amounts from those designated by the fabric feed control data, which deviation being accumulated in so many stitches which are accompanied by fabric feeding amounts in the forward and rearward feeding directions. If the three kinds of patterns A, B, C are stitched by a plurality of sewing machines, it may be possible that any one or more of the patterns $A_0$, $A_1$, $A_2$, $B_0$, $B_1$, $B_2$ and $C_0$, $C_1$, $C_2$ will be obtained, and the resultant cases will be $3=27$ in total.

Now in reference to FIG. 6 showing the block diagram of control circuit of the invention, in which ROM is a read-only-memory which stores a plurality of the stitch pattern control signals, including the button hole stitch signals and program control signals. CPU is a central processing unit for each of program controls. RAM is a random-access-memory which temporarily stores the process of programming operations and the results thereof. I/O is an input-output port. ROM, CPU, RAM and I/O constitute a microcomputer. PS is a pattern selector including pattern selecting switches (not shown), which stitches are located at the top of the sewing machine. When a desired pattern is selected, a result thereof is stored in RAM. PG is a pulse generator which issues a pulse on each rotation of the upper shaft of the sewing machine. The pulse is applied to CPU for reading out the stitch control signals from ROM. $DV_B$ and $D_F$ are electric driving parts for controlling the needle swinging amplitude and the fabric feeding movement. The driving parts $DV_B$ and $DV_F$ drive a needle swing control motor $M_B$ and a fabric feed control motor $M_F$ respectively in accordance with the signals from CPU.

ROM stores the needle swing control signals and the fabric feed control signals with respect to one of the addresses.

According to the invention, a predetermined number of feed adjusting switches, for example, five stitches $SW_1$, $SW_2$, $SW_3$, $SW_4$, $SW_5$ are provided within the sewing machine to be individually set ON or OFF in a predetermined combination at the time of assembling the sewing machine in view of the stitched results of the specific patterns A, B, C which may fall into one or more of the patterns $A_0$, $A_1$, $A_2$, $B_0$, $B_1$, $B_2$ and $C_0$, $C_1$, $2_2$. Thus the five switches so set are designed to produce the informations to the computer to correct the deformed patterns. The five switches to be individually set ON or OFF will take the cases $2^5=32$ which will cover the possible 27 ($3^3$) cases of the specific patterns A, B, C. The remaining 5 cases of the switches may be used as the auxiliary informations to partly correct the specific patterns, for example, the leg part of the dog pattern B.

The ROM of the computer stores a table including correcting data corresponding to the 32 cases of the switches $SW_1$–$SW_5$ to set, and being selectively read out when addressed by the informations of the respective cases of the switches $SW_1$–$SW_5$ set to modify the stitch control data for the respective patterns to be stitched. In reference to FIG. 5 showing one example of the 32 relations between the feed amounts designating data and the actual feeding amounts, the fabric feeding data for controlling the feeding amounts normally determined, for example, by the 7 to 9 steps of the feed control motor $M_F$ may be modified to control the same feeding amounts only with the 9 steps of the feed control motor. Further the fabric feeding data for controlling the feeding amounts normally determined by the minus 7 to minus 9 steps and by the minus 10 to minus 12 steps of the feed control motor $M_F$ may be modified to control the same feeding amounts only with the minus 12 steps of the feed control motor. Such correcting data may be included in the table of the ROM in correspondence to the 32 cases of the feed adjusting switches $S_1$–$S_5$ to be so set. The modification of the data may be applied not only to the three types of the specific patterns A, B, C, but also to the other patterns stored in the ROM. Once the feeding amounts have been corrected, the corrected conditions are maintained and may be reproduced when the patterns are selected again.

In another method, the ROM may store the stitch control data for the patterns including the specific patterns A, B, B together with correcting data specific, for example, to the deformed patterns $A_1$, $A_2$, $B_1$, $B_2$ and $C_1$, $C_2$, in a manner that the specific correcting data is designated by the information of the feed adjusting switches to be individually set ON or OFF in 32 cases in a predetermined combination, when one of the patterns A, B, C is selected. Precisely when one of the patterns A, B, C is selected, the selected pattern is confirmed, and simultaneously it is discriminated if the selected pattern is stitched with the correcting data being applied which is specific to one of the deformed patterns $A_1$, $A_2$, $B_1$, $B_2$, and $C_1$, $C_2$.

We claim:

1. A sewing machine having a microcomputer including memory stitch control data for a plurality of different patterns to be stitched, including a predetermined number of specific patterns of comparatively many stitches, pattern selecting means including a plurality of pattern selecting switches selectively operated to sequentially read out the stitch control data specific to the selected pattern to control a needle position control motor and a fabric feed control motor to thereby produce the selected pattern, said sewing machine comprising a predetermined number of feed adjusting switches provided within said sewing machine to be individually set ON or OFF in dependence upon the formation result of said specific patterns, each of said specific patterns having at least three conditions including one in which each is stitched as expected in accordance with the values of the corresponding stitch control data, another in which each is stitched as deformed due to the accumulated errors in the forward fabric feeding amount and another in which each is stitched as deformed due to the accumulated errors in the rearward fabric feeding amount, said feed adjusting switches being selectively set ON or OFF individually to produce different signals in dependence upon the combinations of switches thus set, so as to cover said three conditions which may be taken by each of said specific patterns, wherein said memory further stores correcting data respectively responsive to said signals produced from said feed adjusting switches so set to thereby modify said stitch control data for a selected pattern, said modified data controlling said fabric feed control motor.

2. The sewing machine as defined in claim 1, wherein said predetermined number of said feed adjusting switches includes five of said switches and said predetermined number of specific patterns includes three of said patterns.

* * * * *